(12) United States Patent
Bary

(10) Patent No.: US 7,016,260 B2
(45) Date of Patent: Mar. 21, 2006

(54) SEISMIC DATA ACQUISITION SYSTEM USING ACQUISITION STATIONS SET ON THE SEA BOTTOM

(75) Inventor: Rénate Bary, Rueil Malmaison (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 429 days.

(21) Appl. No.: 10/310,818

(22) Filed: Dec. 6, 2002

(65) Prior Publication Data

US 2003/0117893 A1 Jun. 26, 2003

(30) Foreign Application Priority Data

Dec. 10, 2001 (FR) .............................. 01 16005

(51) Int. Cl.
*G01V 1/38* (2006.01)

(52) U.S. Cl. ...................... 367/15; 367/16; 181/110
(58) Field of Classification Search ............... 367/3, 367/4, 5, 15, 16, 117, 131, 134, 153; 181/110
See application file for complete search history.

(56) References Cited

U.S. PATENT DOCUMENTS

| | | | | |
|---|---|---|---|---|
| 3,903,497 A | * | 9/1975 | Stimler et al. ............... | 367/3 |
| 4,309,763 A | * | 1/1982 | Passmore et al. ............ | 367/3 |
| 4,463,451 A | * | 7/1984 | Warmack et al. ........... | 367/16 |
| 4,805,160 A | * | 2/1989 | Ishii et al. ................... | 367/134 |
| 4,905,205 A | | 2/1990 | Rialan | |
| 5,113,377 A | * | 5/1992 | Johnson ...................... | 367/20 |
| 5,189,642 A | * | 2/1993 | Donoho et al. .............. | 367/15 |
| 5,253,223 A | | 10/1993 | Svenning et al. | |
| 5,452,262 A | * | 9/1995 | Hagerty ........................ | 367/6 |
| 5,691,957 A | * | 11/1997 | Spiesberger .................. | 367/6 |
| 6,058,071 A | * | 5/2000 | Woodall et al. .............. | 367/3 |
| 6,625,083 B1 | * | 9/2003 | Vandenbroucke ........... | 367/15 |

FOREIGN PATENT DOCUMENTS

FR 2772931 6/1999

OTHER PUBLICATIONS

Bibee et al "Seismic Penetrator Technology For Use In Shallow Water Seismoacoustics" Oceans 93, Engineering In Harmony With Ocean, Proceedings Victoria BC, Canada Oct. 18–21, 1993, pp. 1450–1454, XP010117379 Figures 1, 2.

* cited by examiner

*Primary Examiner*—Jack Keith
*Assistant Examiner*—Scott A. Hughes
(74) *Attorney, Agent, or Firm*—Antonelli, Terry, Stout & Kraus, LLP

(57) ABSTRACT

The invention is a system designed for acquisition of seismic data by means of acquisition stations set on water bottom of a water body. The system comprises acquisition stations (DSAU) combining a streamlined boom suited to penetrate the bottom and thus couple seismic receivers with the underlying formation, a sealed body for electronic data acquisition and communication modules. These acquisition stations (DSAU) are placed in the water and drop to the bottom under the effect of gravity. Relay buoys (RCB) are positioned at the surface, each with a GPS positioning module, a radio link with a central station (CCRU), on a ship for example, and modules providing acoustic communication with bottom acquisition stations (DSAU), which are used to determine the position of the stations in relation to the relay buoys and to exchange control data and seismic data (good running order data or possibly seismic traces acquired if the conditions lend themselves thereto) to provide seismic prospecting or monitoring of an underground formation.

59 Claims, 4 Drawing Sheets

GPS Synchro | Acoustic link for positioning | DSAU | QC and commands | RCB | VHF Radio

SEISMIC DATA ACQUISITION SYSTEM USING ACQUISITION STATIONS SET ON THE SEA BOTTOM

BACKGROUND OF THE INVENTION

1. Field of the Invention

The present invention relates to a seismic data acquisition system using acquisition stations set on the bottom of a water mass.

2. Description of the Prior Art

Activity in the field of seismic exploration of underground zones lying deep under water ranging between about 300 m and 1500 m (referred to as deep offshore) is developing rapidly. The average size of the oil fields that are going to be developed in future increases considerably with the water depth. Since the start-up costs, the production costs and the associated risks are all the higher as depth increases, it is all the more important to optimize the production. This requires new exploration and production technologies allowing reduction of uncertainties and more rapidly producing at an acceptable cost.

Seismic methods are developing constantly. However, despite improved results, their cost is still considered to be too high to be applied systematically. Multicomponent seismic prospecting (3C/4C) and seismic prospecting referred to as repetitive (4D) are clearly identified currently as technologies with the highest expansion potential and which will join together to such an extent that it will be possible to manage underground reservoirs by using the additional data available and to combine them with the data obtained from the instruments in the well. The challenge consists in putting on the market a seismic exploration system with pickups located on the water bottom at a reasonable cost, while taking account of the profit provided by such systems in terms of information abundance and logistic advantages. The most suitable exploration system must meet the requirements of seismic prospecting for reservoir characterization as well as reservoir monitoring during development, notably under deep offshore conditions, while being reliable, effective and economical.

OBC type seismic prospecting methods using a seismic cable or streamer laid on the sea bottom are well-known. Seismic receivers such as geophones mounted on U-joints to provide correct orientation or hydrophones are arranged all along this part and are coupled with the bottom. The receivers are connected by lines internal to the streamer to acquisition equipment on a boat at the surface. Several cables can be laid in parallel, thus forming a 3D seismic device. Such streamers are commonly used down to depths of about 500 m and even, in some cases, of more than 1000 m. The streamers are towed immersed within the framework of seismic prospecting operations or permanently installed within the context of long-term monitoring (4D seismic monitoring). A second boat is used to move the seismic source. This technique is especially used in obstructed zones and in transition zones. Unless the cables are buried in the sediments, coupling of the pickups with the sea bottom is not optimal and, despite a large number of pickups, the seismic data acquired are of average quality.

Devices of this type are for example described in U.S. Pat. No. 4,870,625 and U.S. Pat. Nos. WO-99/23,510, 98/07,050 and U.S. Pat. No. 97/13,167.

It is also well-known for oceanographic research, notably for surveys of the structure and the seismicity of the continental margin, to lower down to the sea bottom (OBS type) acquisition stations consisting each of a sealed box containing seismic receivers, hydrophones and geophones, etc., and the associated electronic equipment, allowing continuous recording of low-frequency seismic signals and storage of the data in a mass memory. Coupling of the pickups in the sedimentation is satisfactory. Recovery of the acquired data occurs after pulling the equipment from the bottom to the surface. A launching device activated by acoustic control from the boat at the surface allows disconnection of a ballast, then pulling of the acquisition equipment to the surface, and signaling devices such as a flag and a warning light allow to locate it at sea. After each use, a station is reconditioned prior to a new immersion. Most of these stations work at depths that can reach 6000 m. The number of stations used for a scientific mission is relatively small and the distance between the stations can range from several hundred meters to several hundred kilometers. The recording time, which can range from one week to several months, is conditioned by the data storage capacity and by the range of the supply battery.

Systems of this type are for example described in U.S. Pat. Nos. 4,422,164, 4,692,906 and U.S. Pat. No. 5,189,642.

It is also well-known to position on the sea bottom seismic data acquisition units so as to improve coupling of the pickups with the underlying formation.

This positioning can be performed using a subsea robot or by launching from the surface acquisition units that are sufficiently streamlined to directly penetrate the bottom under the effect of gravity. These seismic signal acquisition units include a streamlined part or boom provided with a housing for at least one seismic receiver (a 3C geophone and a hydrophone for example), inclinometers for measuring their orientation and a compass and a seismic data collection module, as well as means of positioning each acquisition unit at the bottom (acoustic telemetry), and surface equipment for recovery of the seismic data collected. Recovery of these units at the end of an operation is also performed by means of the robot. A system of this type is made out to work at water depths up to 1500 m.

Acquisition systems of this type are for example described in French patent application 00/16,536 and in French patent 2,738,642 and U.S. Pat. No. 4,134,097.

French patent 2,774,775 filed by the assignee also describes a method for seismic prospecting or monitoring of an offshore reservoir wherein one or more seismic emission units comprising one or more seismic sources associated with a power supply are lowered to the sea bottom, each one of these units being connected to the surface by a multi-function cable. Seismic receivers can also be coupled with the surface of the bottom.

The underwater acquisition devices, whether mobile or coupled with the water bottom are generally associated with acoustic positioning devices. The relative position of the devices in relation to several surface buoys provided with satellite location equipment (GPS positioning system) is located by acoustic telemetry. Locating devices combining acoustic telemetry and satellite positioning are for example described in U.S. Pat. No. 5,119,341 and U.S. Pat. No. 5,579,285.

SUMMARY OF THE INVENTION

The system according to the invention acquires multi-component seismic data from an offshore underground formation by means of acquisition stations in contact with the water bottom either in response to the emission of seismic waves in the water by a surface or bottom impulsive or vibratory source and in synchronism therewith (active seismic), or permanently from microseismic events generated by natural evolutions in the subsoil (passive seismic).

It comprises a central control and acquisition station, floating relay buoys and each including a control module, a satellite positioning signal receiver of GPS type for example, and radio transmitter for data exchange with the central control and recording station, bottom seismic acquisition stations each comprising a sealed body associated with a streamlined part or boom provided with a housing for seismic receivers, which fall under the effect of gravity to the water bottom and to penetrate the bottom so as to couple the seismic receivers with the underground formation, each acquisition station comprising a control set and an acquisition device for the seismic data received by the seismic receivers in the boom.

The relay buoys and the bottom seismic acquisition stations are each provided with an acoustic transmission device comprising an acoustic transponder, an acoustic positioning module and an acoustic communication module for exchanging therewith, by modem via the transponder, either positioning data or control data from the central station or seismic data acquired by the acquisition device, to be transmitted to the central station.

According to an embodiment of the invention, the seismic acquisition stations are divided into groups, each relay buoy to exchanging positioning data and control data or seismic data with the group of bottom acquisition stations that is closer thereto than to the other relay buoys.

According to an embodiment of the invention, each acquisition station comprises for example a storage of seismic record traces corresponding to seismic signals picked up by the seismic receivers of each acquisition station and means in the control unit for controlling the deferred transfer, at a particular transmission frequency, to a relay buoy via its acoustic communication module, of at least part of the stored seismic traces (either only quality data guaranteeing the good working order of the bottom acquisition stations, or all of the seismic traces if the distance between the acquisition stations and the relay buoys is not too great).

According to another embodiment of the invention, each acquisition station comprises means for optically transmitting the recorded seismic data to a relay buoy or a subsea vehicle in the vicinity of each acquisition station.

According to another embodiment of the invention, each acquisition station comprises means for storing seismic record traces corresponding to seismic signals picked up by the seismic receivers of each acquisition station and means, in the control unit, for forming data indicative of the good working order of said acquisition station and for controlling the transfer, at a particular transmission frequency, of the data formed to a relay buoy (RCB) via its acoustic communication module.

According to an embodiment of the invention, each relay buoy comprises means cooperating with the control module for acquiring and dating the acoustic signals relative to the position of acquisition stations and for transmitting them to the central station simultaneously with its own coordinates received by the receiver of the satellite positioning system.

According to another embodiment of the invention, each relay buoy comprises means for recording the acquired seismic data coming from the acquisition stations and to be transmitted to the central station.

According to an embodiment of the invention, each acquisition station comprises means for providing buoyancy associated with the sealed body and launching means for disconnecting the body from the corresponding boom, at the command of the central station.

According to another embodiment of the invention, each acquisition station comprises means for coupling with an industrial transmission network allowing direct transfer of the seismic data stored to the central station.

According to an embodiment of the invention, the central station comprises a control set including a central unit associated with storage means, and interface elements that manage exchanges between the central unit and display and printing means, mass storage means, means for communication with the acquisition stations and relay buoys, devices for communication with the relay buoys by radio and for reception of GPS positioning signals, and a set for controlling and triggering a seismic source.

According to another embodiment of the invention, each acquisition station comprises means for providing optical transmission of the recorded seismic data to a relay buoy or to a vehicle.

According to another embodiment of the invention, each relay buoy comprises means for managing the transmission of the signal triggering a seismic source in order to best synchronize the acquisition of seismic data by all of the bottom stations.

According to another embodiment of the invention, the system comprises a portable control and testing station for the acquisition station and data deployment and recovery logistics, including means for locating the acquisition stations when they are back at the surface by means of a radio link, means for downloading data stored in acquisition stations and recording thereof, means allowing remote recovery of seismic data stored in relay buoys, and means for transferring seismic data to the central control and recording station by means of a communication network.

The method for seismic exploration or monitoring of a subsea underground formation according to the invention comprises installing, at the water bottom, a series of seismic signal acquisition units comprising a streamlined part or boom provided with a housing for at least one seismic receiver and an acquisition module for the seismic data received by each receiver, each acquisition unit going down, under the effect of gravity, to the water bottom and to coupling the seismic receivers with the underground formation; determining the position of each acquisition unit installed at the bottom; carrying out seismic operations with emission of waves by an underwater seismic source, reception of the waves reflected by discontinuities of the underground formation in response to the waves emitted in the formation, collection of the data received by the receivers of each acquisition unit; and recovery, by a central station, of the seismic data acquired by each acquisition unit.

It comprises exchange, between the relay buoys and the bottom seismic acquisition stations, either by positioning data or of control data from the central station, or of the seismic data acquired by the bottom acquisition devices and to be transmitted to the central station via devices in each of the bottom acquisition device and each relay buoy comprising an acoustic transponder, an acoustic positioning module and an acoustic communication module using a modem.

According to an embodiment of the invention, the method comprises positioning and initial synchronization of each bottom seismic acquisition station as it is put into water, by reference to a satellite positioning system of GPS type for example, and monitoring its descent to the bottom by combination of time synchronization and time measurement data obtained by acoustic telemetry between the acquisition station and the various relay buoys, until the station in contact with the bottom is stabilized.

According to an embodiment, the method comprises acoustic transmission of seismic record traces picked up by the seismic receivers from each acquisition station to the corresponding relay buoy by means of the corresponding sets.

According to an embodiment, the method comprises acoustic transmission, from each acquisition station to the corresponding relay buoy by means of the corresponding sets, of quality data indicative of the good working order of each acquisition station.

BRIEF DESCRIPTION OF THE DRAWINGS

Other features and advantages of the method and of the system according to the invention will be clear from reading the description hereafter of embodiments given by way of non limitative example, with reference to the accompanying drawings wherein.

DETAILED DESCRIPTION OF THE INVENTION

Figure 1:
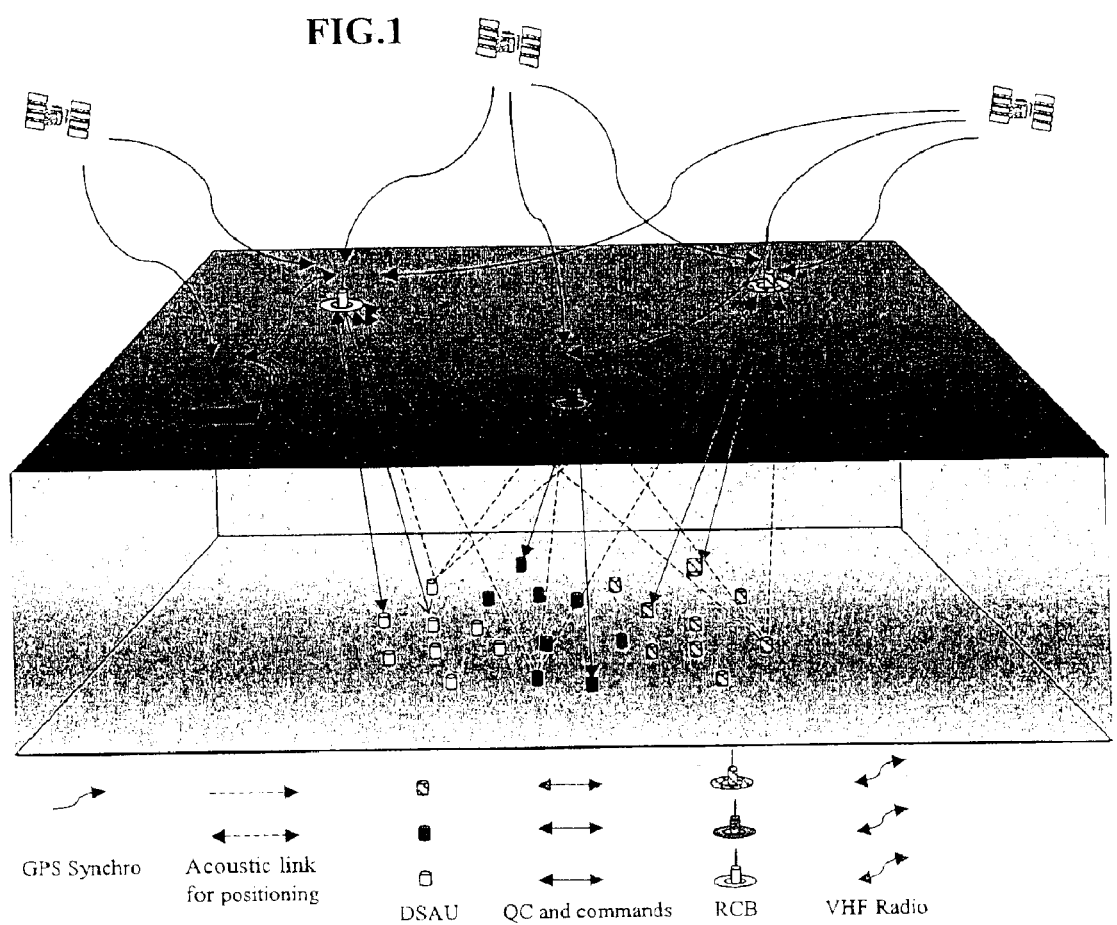
FIG. 1 diagrammatically shows the spatial distribution of the various elements of the acquisition system installed above a formation to be investigated, FIG. 2 diagrammatically shows the structure of each bottom acquisition station DSAU, FIG. 3 diagrammatically shows the flowchart of each bottom acquisition station, FIG. 4 diagrammatically shows the block diagram of the acquisition chain for the signals picked up by the seismic receivers of each bottom acquisition station DSAU, FIG. 5 diagrammatically shows the flowchart of each relay buoy RCB at the surface, FIG. 6 diagrammatically shows the flowchart of central station CCRU.

The system is modular and comprises (FIG. 1) the following elements recoverable acquisition stations DSAU set on the sea bottom for acquisition of seismic data; control relay buoys RCB positioned at the surface, radio links for information, command and data exchange between control relay buoys RCB and the control equipment aboard a ship; bi-directional bottom-surface acoustic links for positioning, commands and data transmission for providing at least to control (QC) the good working order of the bottom equipment; GPS type links for positioning of the relay buoys RCB and of acquisition stations DSAU after recovery thereof at the surface; radio links activated by acquisition stations DSAU after they have returned to the surface to allow transmission of the positioning coordinates to the recovery ship. The system comprises a control equipment aboard the ship, comprising: a portable set PTCU for testing and controlling the equipment in the water, to which part of the functionalities of central station CCRU is preferably delegated so as to provide more flexibility for carrying out operations; a centralized recording and control station CCRU a board the ship, comprising a device for controlling the position of and for locating the acquisition modules for recovery; and a DGPS station of a well-known type serving as a reference, which transmits the differential position correction parameters to relay buoys RCB, which increases the accuracy with which each one determines its position.

I Bottom Acquisition Station DSAU

Figure 2:
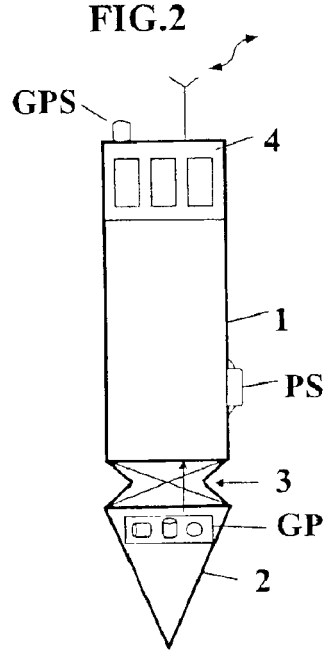

Each acquisition station DSAU comprises (FIG. 2) a pressurized cylindrical box 1 which contains various constituent electronic modules. A conical boom 2 is fastened to the base of cylindrical box 1 by means of a removable hooking device 3. It favors the descent of the station, under the effect of gravity, towards the sea bottom, substantially vertically to the launching point, and sufficient coupling with the bottom considering the possible currents. Boom 2 is mechanically uncoupled from cylinder 1 and comprises housings for various seismic pickups S (at least one assembly comprising a three-component geophone or triphone associated with a hydrophone). A buoyancy device 4 comprising buoys, a gas tank and a control element is fastened above cylindrical box 1 so as to bring the station back to the surface when the cylindrical box is uncoupled from boom 2.

Each station preferably comprises a mechanism (not shown) for propulsion in the sediments of the sea bottom at the time of the impact so as to ensure perfect coupling of the pickups. The propulsion mechanism can be released either by detection of the ground contact of the DSAU, or from a command received by relay and control buoy RCB when the positioning system has detected setting of the DSAU on the sea bottom.

According to an alternative, each bottom station can also comprise cylinders (two or three for example) fastened to a central axis supporting the conical boom.

Figure 3:
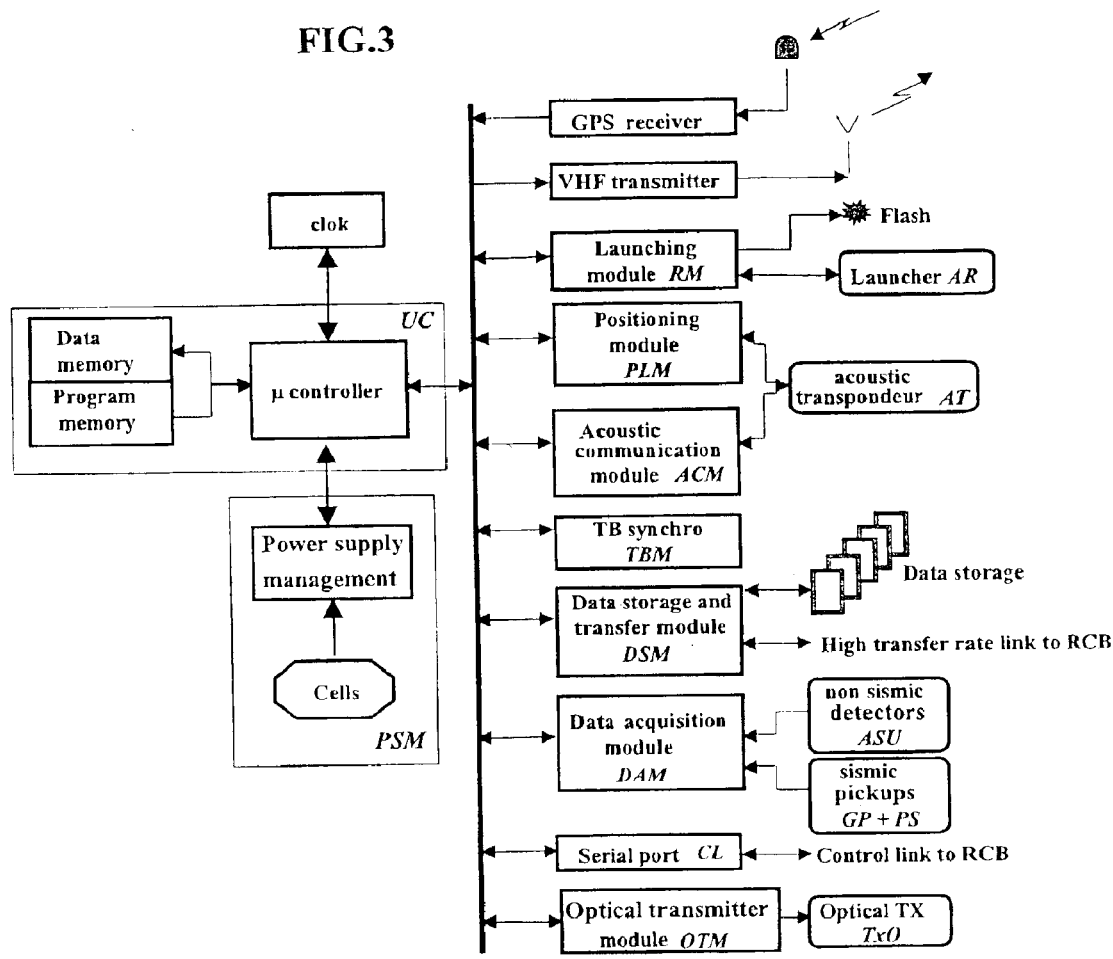

Each base acquisition station DSAU is for acquisition of the signals received by the seismic pickups: 3C geophone in boom 2 and the hydrophone, and it is provided with a certain number (up to ten) inputs for auxiliary pickups or devices. It comprises (FIG. 3): a control unit UC dedicated to the management of the station, comprising a microcontroller and data and program memories, a high-precision clock required for dating of the various events, a GPS receiver and a VHF radio emitter, which are activated only when the DSAU is at the surface, a launching module RM allowing launcher AR of the DSAU to be triggered so that acquisition station DSAU can return to the surface and be recovered, a positioning and locating module PLM comprising an acoustic transponder AT for determining the position of the module from the surface, an acoustic communication module ACM also using an acoustic transponder AT allowing the necessary exchanges for transmission of the quality control data (QC) relative to the bottom equipment, for starting recording cycles and for triggering the hooking device so as to release the box, a signal processing device TBM for synchronization of data acquisition with triggering of the seismic shots, a data storage module DSM connected to a data storage set (microdisk or flash disk) and comprising a high-rate link allowing to download seismic data after recovery of the acquisition stations DSAU at the surface, aboard the boat, a data acquisition module DAM comprising an analog seismic data acquisition and conversion part (preamplifiers, analog-to-digital converters, filtering) and an interfacing part with the non seismic detectors, a series of non seismic detectors ASU comprising, among other things, a pressure detector, a moisture detector, a contact detector, etc., a seismic receiver module GP comprising at least a 3-component geophone associated with a device for coupling to the sea bottom and a hydrophone PS arranged in the upper part of the box, a medium-rate link with the outside of the box allowing initialization and control of the DSAU before deployment and after recovery, and a power supply management module PSM.

I-1 Control Unit UC of Acquisition Station DSAU

Control unit UC comprises a low-consumption microprocessor of DSP (Digital Signal Processor) type. Programmable logic circuits are used to manage the input-output resources, the interrupts and the specific interfaces for the non seismic detectors or devices such as acoustic communication module ACM, launching module RM, positioning module PLM, the GPS receiver and the VHF transmitter/receiver in launching module RM, data storage module DSM and the high and medium rate cable links for seismic or control data exchange with the outside of the box. The DSAU application program is stored in a reprogrammable memory and the dynamic data, seismic data or parameters, are contained in a random access memory of suitable capacity.

I-2 Internal Clock

An oscillator of OXCO (oven-compensated crystal oscillator) type, for example, with a $2\times10^{-9}$ (1 ms/5 days) accuracy, is required for precise dating of the events linked either with positioning or with seismic acquisition. For longer periods of service, recalibration will probably be necessary. Synchronization of the clock, of the date and of the time is carried out before putting the DSAU into water by means of the PPS (pulse per second) signal of an internal or external GPS receiver. The date and time accuracy has to be greater than 1 $\mu$s.

I-3 Service Links

In order to communicate with the DSAU aboard the ship without the box having to be opened, the following two cable links are used:

a) an external GPS link with a serial port of RS-232 or RS-422 type, whose transfer rate is self-configured according to the connected device. This link serves for configuration and maintenance of the DSAU, and possibly for synchronization of the internal clock of the DSAU by a receiver, b) a high-rate link for recovery of the recorded data.

I-4 Data Acquisition Module DAM

Data acquisition module DAM is in charge of the seismic receiver module SRU comprising the 3C geophone, hydrophone module PS and non seismic detector module ASU detecting the power supply voltage, the pressure for positioning, the moisture content in the box, the ground contact of the DSAU, the inclinometer and the compass.

Module DAM is in charge of digitizing of the analog signals of the seismic pickups, acquisition and control of the non seismic detectors, a coupling tester allowing checking of the coupling state of the geophones, and a testing generator allowing testing of the quality of the seismic channels.

Figure 4:
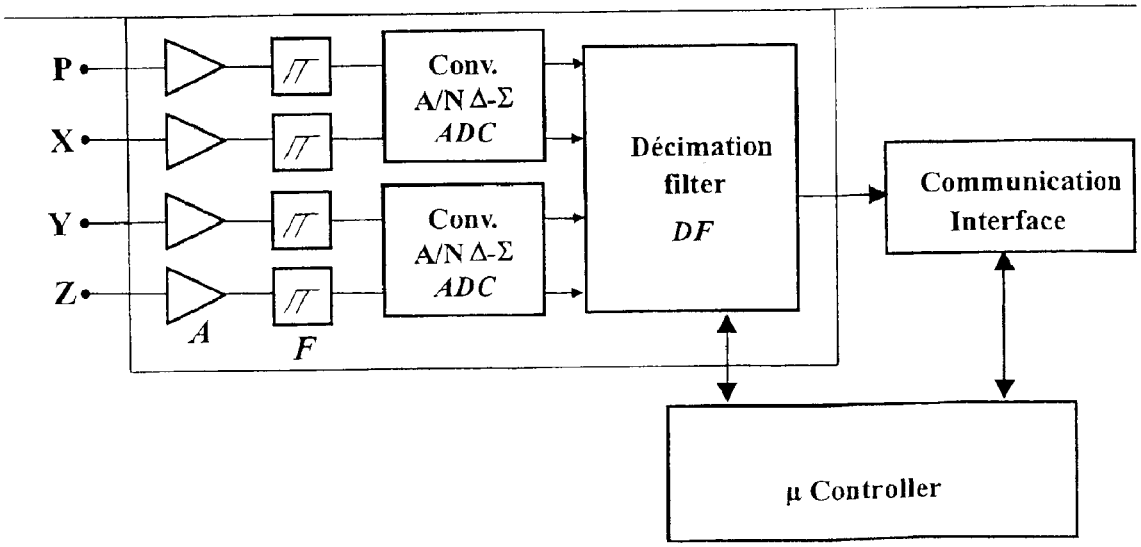

The circuits for digitizing the seismic signals received by the three-component X, Y, Z geophone and hydrophone P comprise, for each channel (FIG. 4), an amplifier A and a filter F, and a Delta-Sigma type analog-to-digital converter ADC with decimation filter DF, which are all low-consumption devices. Conversion is carried out on 24 bits with a clock frequency of 2048 MHz. The sampling period will be 0.5-1-2 or 4 ms between 3 Hz and 824-412-206-103 Hz respectively. The signal dynamics is 120 dB for example.

The digitizing circuits for the non seismic detectors are functionally identical but the sampling period is much longer (1 s for example) and adapted according to the specifications of the specific devices used.

I-5 Geophone Module GP

Geophone module GP comprises a 3-component geophone as a standard feature and, optionally, an X-Y inclinometer and a magnetic compass. The base of the module is streamlined so as to allow optimum coupling suited to S waves. This module is arranged in the boom of bottom acquisition station DSAU sunk in the sediments of the sea bottom to provide perfect coupling of the pickups.

I-6 Data Storage Module DSM

The acquired seismic data are stored on a non-volatile storage medium having one or more disks based on flash memory technology or on microdisks. The minimum storage capacity is for example 1 gigabyte expandable to 4 gigabytes. A capacity of the order of 1 gigabyte is sufficient for storage of about 26 000 10-s shots at a sampling period of 2 ms with a compression ratio of 1:2. For a 3000-m deep objective, the shooting area to be covered is of the order of 36 km$^2$, which corresponds to 28 800 shots at the rate of a shotpoint every 25 m and with an inter-line distance of 50 m.

I-7 GPS Receiver

The GPS receiver fulfils two functions synchronization of the internal clock of the DSAU prior to deployment of the device, and acquisition of the positioning coordinates after return of station DSAU to the surface to facilitate location of the acquisition assemblies at the time of the bottom data recovery.

The GPS receiver is deactivated as long as acquisition station DSAU remains completely under water.

I-8 Positioning and Locating Module PLM a) Positioning and locating principle The positioning principle of the network of buoys positioned at the surface of the water (2 at the minimum) measures the travel time of a signal emitted by an acoustic source, for example the transponder of an underwater vehicle AUV, or from a bottom station DSAU. The acoustic source periodically emits two successive signals: the first synchronous with the GPS time and the second with a time lag as a function of the depth. These signals are received by all the buoys which date very precisely the arrival of these two signals with the corresponding GPS time. The buoy then transmits to the control system, via a radio link, its own position DGPS associated with the arrival times received by the DSAU. Knowing the propagation velocity of sound in water, the propagation time is directly converted into transponder/buoy distance. Since the depth is precisely measured by each buoy, the position of the acoustic source is obtained by the intersection of circles having a radian equivalent to the slant range in the horizontal plane.

The positioning accuracy is of the order of 1 meter or less, according to the depth of the device.

The positioning system is activated as soon as each station DSAU is put into water, thus allowing monitoring its trajectory in the water throughout its descent. Installation of the DSAU can be considered to be completed as soon as its position remains stable. The positioning system can then be deactivated until recovery time or to allow checking its position sporadically during operations.

b) Acoustic transponder AT

The required characteristics of the acoustic transponder used for transmission of telemetric data are as follows: frequency: 34 kHz, repetition period: 1 to 2 s, clock stability: $10^{-8}$/month, pressure detector: 0–30 MPa, 1%.

Synchronization of the clock has to be performed by means of the output signal PPS (Pulse Per Second) of the GPS receiver before putting station DSAU into water.

In order to optimize the equipment of bottom station DSAU, this acoustic transponder is preferably used also by the acoustic communication module.

I-9 Acoustic Communication Module ACM

The two-directional acoustic link via modem will be used to transmit the commands linked with the operations of the central control and recording unit CCRU on the boat to the DSAUs by means of the buoys RCB positioned at the surface and to receive the quality control data QC therefrom. This link will also be used for precise synchronization of the seismic shots. A rate of 1200 bits/s for example would allow to transmit 150 bytes/s, which would be sufficient for nearly-continuous control during seismic operations. Each buoy RCB is preferably associated with an acoustic natural frequency for communication with the acquisition sets DSAU of the device which are assigned thereto. This also allows optimizing the acoustic range.

The commands allow managing the various functionalities of the DSAU such as electric power supply management, functions activation or deactivation, their configuration, parameterization for seismic acquisition, control of the seismic operations and of data recording, etc.

The quality data QC transmitted from each station DSAU allows obtaining a working diagnosis: quality of the seismic signal, control of the power supply level, data recording capacity monitoring, electronics control, etc.

Transmission of all of the seismic data acquired is more difficult to achieve. For a seismic shot of 10 s to 2 ms and a compression factor of 2, for example, the recovery of 4 traces from a station DSAU would last 3 min 20 s considering the medium transfer rate of 1200 bits/s. For a low rate of 20 bits/s, it would take 3 h 20 s and for a high rate of 4800 bits/s, 50 s. For the data of a complete shot, this time has to be multiplied by the number of DSAUs of the device divided by the number of relay buoys RCB, in cases where the buoys RCB can receive data simultaneously.

I-10 Launching Module RM

The launching system is triggered from a command coming from either central control and recording unit CCRU or the portable testing system PTCU. This ensures triggering of the launching mechanism causing the container to return to the surface and the locating devices to be activated for pickup. Geophone module GP can possibly be disconnected from the DSAU and abandoned on the sea bottom if the buoyancy assembly is not sufficient to free the boom from the bottom. Upon reception of the launching command, station DSAU activates the positioning system and programs, considering the rise time, the activation timing of the GPS receiver, of the radio transmitter and of the visual locating flash of station DSAU.

I-11 Radio Transmitter

The radio transmitter allows transmitting the GPS coordinates to relay buoys RCB or directly to the pickup ship. The transmitter is effectively activated only after the DSAU has returned to the surface. The radio frequency used is the same as the frequency used for the link between relay buoys RCB and central control and recording station CCRU.

I-12 Synchro Module TB

The function of synchro module TB is to determine with precision ($\leq 100$ $\mu$s) the source triggering time and in synchronizing the data acquired with this time. As a general rule, seismic acquisitions are started in synchronization with seismic source triggering. This requires transmission of a synchronization signal, TB (Time Break) in the case of seismic operations, from the source through central control and recording station CCRU, buoys RCB to acquisition stations DSAU. Considering the delays involved, which are essentially linked with the transmission of this signal in the different media, air and water, it is necessary to resort to artifice to apply corrections taking account of the various traveltimes. The whole of the elements of the system is synchronized very precisely with the time obtained by the GPS receiver. Central control and recording station CCRU associates the time with the precise time of triggering a seismic shot. This information is transmitted to bottom stations DSAU immediately after the acquisition synchronization signal, which enables them to resynchronize the seismic samples acquired by applying the method described in French patent 2,787,201 corresponding to U.S. Pat. No. 6,253,156 filed by the assignee.

I-13 Supply Module PSM

The electric power supply module is designed so as to allow easy replacement thereof and so that the supply capacity can be suited to the requirements of the seismic operation. For short operations, alkaline cells can probably be used, but costlier lithium cells will be necessary for longer operations. The power supply range must be, at the minimum, 7 days of nearly continuous operations. Optionally, the supply capacity has to be extensible to 1 month or more.

II Relay Buoys RCB

Each relay and control buoy RCB is positioned at the surface of the water above the bottom seismic device. Two buoys RCB are necessary at the minimum. The bottom stations are divided into as many groups as there are relay buoys and management of the exchanges with the bottom stations which are the closest thereto is assigned to each relay buoy. Their function is: serving as a relay for the data exchanged with central control and recording station CCRU aboard the boat, by radio link, and with acquisition stations DSAU, by acoustic link, acquiring and dating the acoustic signals relative to the positioning of stations DSAU and in transmitting them to central station CCRU at the same time as its own GPS coordinates received by the GPS receiver, recording the seismic data coming from stations DSAU on a mass memory (disk) if the progress of the seismic operations permits to do it and provided that the transfer rate of the acoustic link is sufficient.

The electronic equipment of each relay and control buoy comprises (FIG. 5): a microprocessor card CPU (of PC type) for management of the buoy, a high-capacity disk HD, a network interface of Ethernet ETH type for example, at least one cable link (COM1, COM2) for communication with station DSAU on the deck of the ship, a precise clock H, a GPS receiver Rx, a radio transmitter/receiver Rx/Yx, VHF for example, an acoustic module for positioning PLM, a transponder or hydrophone AT used for positioning and data transmission, an acoustic modem for data transmission ACM, a seismic shot synchronization interface TBM, an electric power supply management module PSM provided by cells and a solar array to increase the range, a positioning control module ASP coupled to the propulsion device PROP of buoy RCB, and an anchoring device in case of use in shallow waters.

II-1 Microprocessor Card

The microprocessor card is for example a low-consumption PC card of industrial type suited to manage the disk and later transfer of the seismic data stored thereon to central control and recording station CCRU through a high-rate communication network.

II-2 Radio Link

The radio link between central control and recording station CCRU and bottom stations DSAU via relay buoys RCB is for example a radio transmission channel in the 216–220 MHz or 450–470 MHz band for example. A transfer rate of about 10 kbits/s is suitable. This link is used: by the acoustic positioning module for reception of the commands from central station CCRU to bottom stations DSAU and reception of the positioning information therefrom, for data exchange during seismic acquisition:

commands received by central control and recording station CCRU for bottom stations DSAU and transmission of quality control data QC or of seismic data coming therefrom.

Each buoy RCB is identified by a specific address and has a natural radio emission frequency. The reception frequency is the same for all of the buoys.

II-3 Acoustic Modem Link

It is a two-directional acoustic link by modem. Each buoy RCB has its own acoustic frequency for communicating with the bottom stations DSAU of the system assigned thereto. This also aims to optimize the acoustic range. The transfer rate of the link can be selected between 20 and 4800 bits/s according to the transmission conditions. A medium rate of 1200 bits/s is generally suitable.

II-4 Acoustic Positioning Module

This module communicates with an acoustic transponder, a very precise and stable clock ($10^{-8}$ a month), the GPS receiver and the radio transmitter-receiver. The clock is synchronized with the signal 1 PPS (Pulse Per Second) of the GPS receiver before installation of the relay buoy. The signal repetition period is 1 or 2 s for example.

II-5 Seismic Shot Synchronization Interface

This interface is suited to manage the transmission of the seismic source triggering signal in order to best synchronize the acquisitions at the level of all of the bottom stations DSAU.

II-6 Relay Buoy Power Supply

The power supply capacity of each relay buoy is adjustable considering its functionalities and the length of the operations. The cells are conditioned in a self-contained box to facilitate their replacement during operations if need be.

Addition of a solar array allows to increase the range of the cells.

II-7 Controllable Propulsion Device

More or less strong marine currents are likely to cause the buoy to drift after its installation. Cyclic transmission of the GPS coordinates to central control and recording station CCRU allows the drift to be monitored continuously. A controlled omnidirectional propulsion device allows the buoy to be held in position. The known principle of self-propelled buoys is suited to relay buoy RCB. The velocity of displacement of this type of buoy can reach 3 knots and its range, between one and seven days, essentially depends on the type of energy used.

In cases where the system is used in shallow or medium deep waters, a system of anchoring the buoy to the sea bottom is preferably used because it is less costly.

II-8 Optical Transmission

Figure 5:
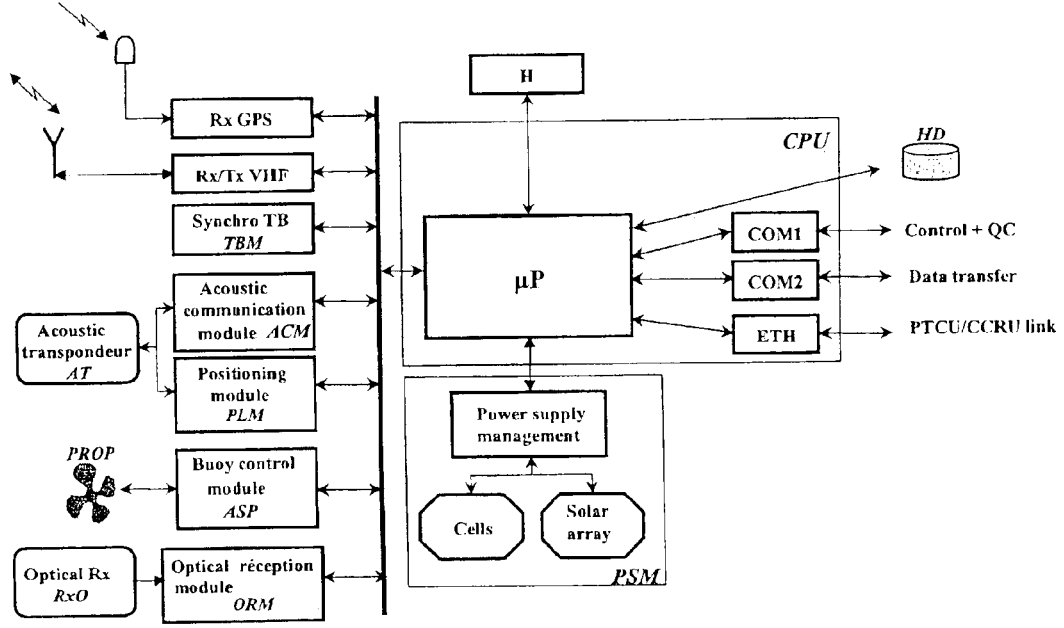

When the bottom acquisition stations are at a relatively short distance from a data transmission device: the relay buoys or possibly a subsea vehicle passing nearby and equipped with a collection assembly, it is also possible to use an optical transmission channel to transfer to this collection assembly the collected seismic traces. In such a case, it is possible to use as the collection assembly the communication electronics of a relay buoy with which an optical communication module ORM and an optical receiver RxOPT are associated (FIG. 5). The acoustic means of the electronic module are used to transmit data transfer commands to the bottom acquisition stations, which use the optical transmitter to transmit in return the data to the collection assembly.

III Central Control and Recording Station CCRU

Figure 6:
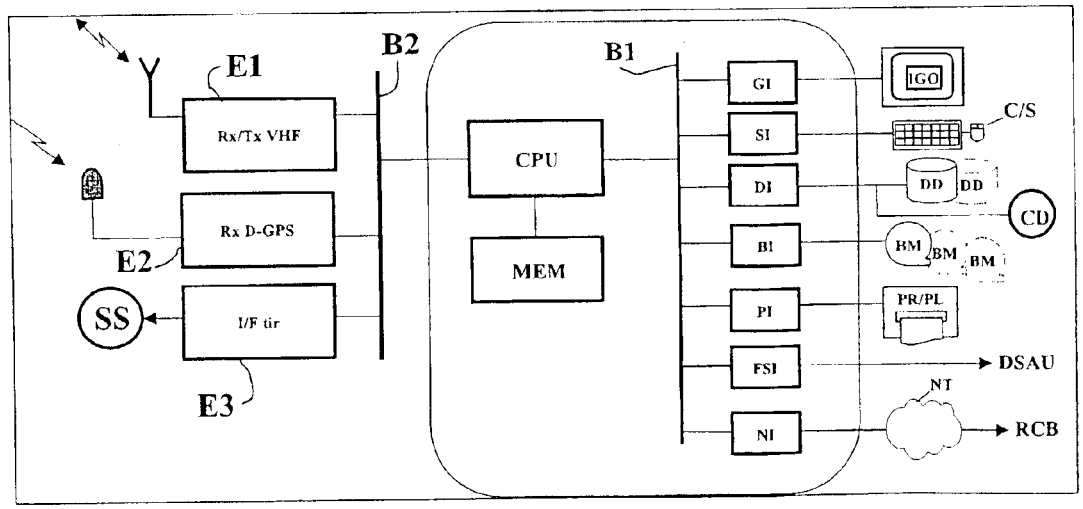

As illustrated by the flowchart of FIG. 6, central control and recording station CCRU, which can be aboard a ship for example, first comprises a control set UC including a central unit CPU associated with memories MEM. This central unit communicates by a first bus B1 with the following interfaces: a graphics interface GI that manages exchanges with a display screen IGO, a serial interface SI that manages exchanges with a keyboard and a mouse, an interface DI that manages exchanges with storage disks and optical disks, an interface BI that manages exchanges with magnetic tape transports, a parallel interface PI that manages exchanges with printers, a fast serial interface FSI that manages exchanges with the bottom stations DSAU before immersion or after recovery thereof at the surface, and an interface NI that manages exchanges through a local communication network (of Ethernet type for example) with surface buoys RCB.

By means of a second bus B2, central unit CPU communicates with: a VHF radio wave transmission-reception set E1, a GPS positioning signal reception set E2, and a seismic source SS control and triggering set E3.

Figure 7:
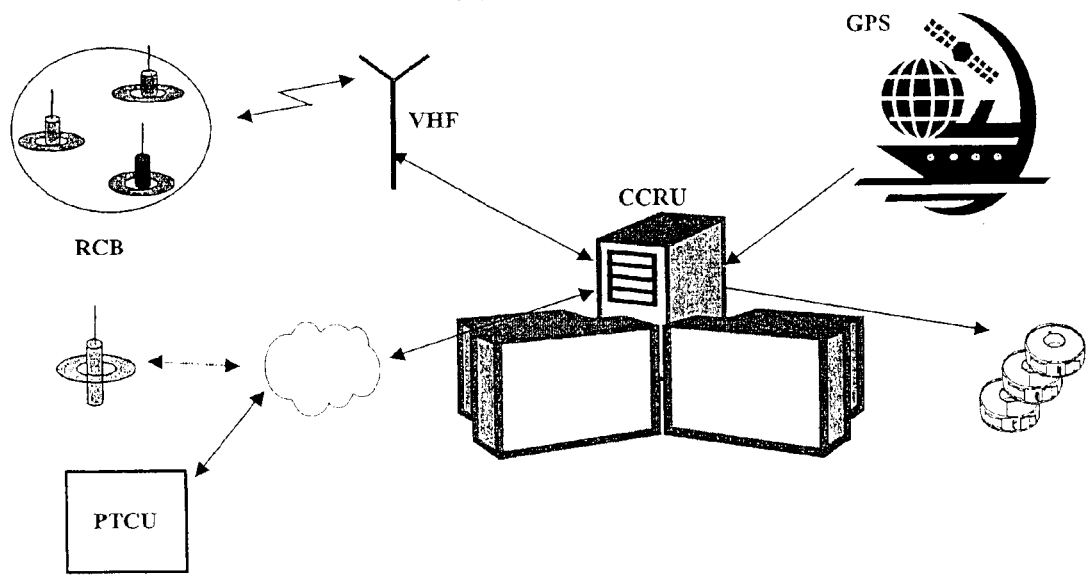
FIG. 7 is a block diagram of the central station illustrating its main functionalities.
Figure 8:
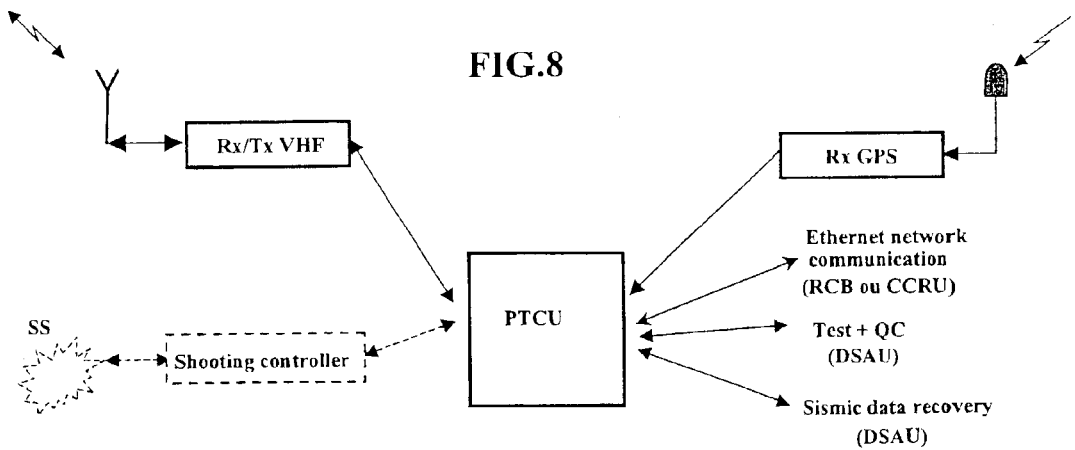
FIG. 8 is a block diagram of an auxiliary central station PTCU to which the acquisition equipment deployment and recovery logistics, as well as the maintenance thereof, can for example be delegated.

As also illustrated by the block diagram of FIG. 7, the central station fulfils the following functions management of the graphics control interface for the operator, management of the VHF radio link for control and monitoring of the acquisition equipments in the water, relay buoys RCB and stations DSAU, graphic processing and display of the positioning information during the acquisition equipment deployment and recovery stages, creation and maintenance of a database comprising the positioning information and the functional state of the equipments in the water, management of the interface with the GPS navigation system of the ship and of the seismic source control device, control and monitoring of the seismic operations, display of the error events and of the information contained in the quality control data QC, recovery of the seismic data acquired: either by means of the radio link, if the data transfer rates are sufficient, during seismic acquisition dead times, or from buoys RCB or from portable testing central station PTCU by means of the communication network after recovery of the equipment: relay buoys RCB and bottom acquisition stations DSAU, and recording of all the seismic data in a standardized format (SEG-D for example) on magnetic material.

IV Portable Control and Testing Station PTCU

In order to allow operations to be carried out with more flexibility, part of the functionalities of central station CCRU can be delegated to an auxiliary central control and testing station PTCU to which the acquisition equipment deployment and recovery logistics and maintenance are assigned. Portable station PTCU is structured around a powerful portable PC ("hardened"). Its functionalities are for example graphics control interfacing for the operator, configuration parameters initialization for acquisition equipment DSAU and RCB, carrying out quality control tests QC and working order control of each station DSAU, management of VHF radio transmitter-receiver for control and monitoring of the positioning of the acquisition equipment in the water, relay buoys RCB and stations DSAU, graphic processing and display of the positioning information during acquisition equipment deployment and recovery stages, creation and maintenance of a database comprising positioning information and data on the functional state of the equipments in the water, locating acquisition stations DSAU after they have returned to the surface by means of the VHF radio link, optionally, management of the interface of the seismic source control device and control of the seismic acquisitions, downloading the data stored in a certain number of acquisition stations DSAU in parallel and recording thereof on an internal hard disk or, optionally, on magnetic cartridges, recovery of the seismic data of relay buoys RCB by means of the network communication in cases where these data resulting from acquisitions have been stored in these buoys, and transfer of the seismic data to central control and recording station CCRU by means of an industrial communication network of Ethernet type for example.

V Description of the Operations

Deployment of the system is carried out as follows:

Relay buoys RCB are first prepared and put into water above the formation to be explored.

Each bottom station DSAU is configured, checked and synchronized on the deck of the ship prior to being put into water.

Bottom stations DSAU are then successively thrown overboard and they sink onto the sea bottom under the effect of gravity. Their positioning is monitored by means of portable testing system PTCU or of central control and recording station CCRU. It is necessary to take account of the marine currents that may cause a more or less great drift of the trajectory of the stations towards the bottom. By way of example, it is for example assumed that the velocity of descent of a station DSAU is 1 m/s and that the position assigned thereto is 3000 m deep. For a current varying by approximately 40 cm/s between 0 and 1500 m, then by 7 cm/s down to 3000 m, without considering the counter currents, the landing point is diverted by approximately 700 m in relation to the desired point. In some cases, the difference may even reach one or more kilometers. Generally, ocean currents are stronger at the surface. To take account of the drift due to currents, it may be necessary to launch a first DSAU, to determine its landing point and then to correct the launching point considering the real drift.

Once setting is completed, acquisition of the seismic data can start. After each seismic shot, the data are stored in storage module DSM (FIG. 3) of each bottom station. The two-directional acoustic link between bottom acquisition stations DSAU and relay buoys RCB allows transmission of a quality data QC representative of the good working order of the bottom stations and of the quality of the seismic data acquired during the seismic operation sessions.

The two-directional acoustic link between bottom acquisition stations DSAU and relay buoys RCB can also allow, if the water level is not too great and the rate sufficient, to transmit to the surface at least part of the seismic traces recorded in the bottom acquisition stations.

Recovery of the bottom acquisition stations DSAU is carried out at the end of the seismic shots by acoustic activation of hooking device 3 (FIG. 2) and release of acquisition boxes 1 that can return to the surface. The visual devices, flags and flashes, and the activation of the GPS receiver and of the VHF transmitter will facilitate location and collection of stations DSAU.

Recovery of the seismic data is carried out for example with the portable testing system PTCU which is connected to central control and recording station CCRU by means of a fast industrial network link of Ethernet type for example.

After reconditioning, replacement or recharging of the cells and of the ballast, bottom stations DSAU are again operational.

What is claimed is:

1. A system for acquiring of seismic data relative to an underwater underground formation, comprising:
   a central control and acquisition station;
   relay buoys which float on water, the buoys each including a control module, a positioning signal receiver providing satellite positioning of the buoy, and a radio transmitter for exchanging data with the central control and acquisition station;
   bottom seismic signal acquisition stations, the bottom seismic signal acquisition stations each including a sealed body including a pressure detector and associated with a part or boom provided with a housing for seismic receivers, the bottom seismic signal acquisition stations descending under an effect of gravity to a water body bottom and penetrate the bottom so as to couple the seismic receivers with the underground formation to obtain the seismic data relative to the underwater underground formation, a control unit and a device for acquiring seismic data received by the seismic receivers in the part or boom and by the pressure detector; and
   wherein
   the relay buoys and bottom seismic acquisition stations are each provided with an acoustic transmission device including an acoustic transponder, an acoustic positioning module and an acoustic communication module for exchanging, by modem via the acoustic transponder, either positioning data, control data from the central control and acquisition station or seismic data acquired by the seismic receivers to be transmitted to the central control and acquisition station.

2. A system as claimed in claim 1, wherein the bottom seismic signal acquisition stations are divided into groups, each relay buoy providing exchange of positioning data, control data, or seismic data with one group of the groups of seismic acquisition stations that is closer thereto than other relay buoys.

3. A system as claimed in claim 1, wherein each acquisition station comprises storage means for seismic record traces corresponding to seismic signals picked up by the seismic receivers of each seismic acquisition station and means in the control unit for controlling deferred transfer to one of the relay buoys, via the acoustic communication module at least part of stored seismic traces, at a transmission frequency.

4. A system as claimed in claim 2, wherein each acquisition station comprises storage means for seismic record traces corresponding to seismic signals picked up by the seismic receivers of each seismic acquisition station and means in the control unit for controlling deferred transfer to one of the relay buoys, via the acoustic communication module at least part of stored seismic traces, at a transmission frequency.

5. A system as claimed in claim 1, wherein each seismic signal acquisition station comprises storage means for seismic record traces corresponding to seismic signals picked up by the seismic receivers of each seismic acquisition station and means, in the control unit, for forming data indicative of a working order of the seismic signal acquisition station and for controlling transfer, according to a transmission frequency, the formed data to one of the relay buoys via the acoustic communication module.

6. A system as claimed in claim 2, wherein each seismic acquisition station comprises storage means for seismic record traces corresponding to seismic signals picked up by the seismic receivers of each seismic acquisition station and means, in the control unit, for forming data indicative of a working order of the seismic acquisition station and for controlling transfer, according to a transmission frequency, the formed data to one of the relay buoys via an acoustic communication module.

7. A system as claimed in claim 1, wherein each seismic signal acquisition station comprises means for optical transmission of the recorded seismic data to one of the relay buoys or to a vehicle.

8. A system as claimed in claim 2, wherein each seismic signal acquisition station comprises means for optical transmission of the recorded seismic data to one of the relay buoys or to a vehicle.

9. A system as claimed in claim 3, wherein each seismic signal acquisition station comprises means for optical transmission of the recorded seismic data to one of the relay buoys or to a vehicle.

10. A system as claimed in claim 4, wherein each seismic signal acquisition station comprises means for optical transmission of the recorded seismic data to one of the relay buoys or to a vehicle.

11. A system as claimed in claim 5, wherein each seismic signal acquisition station comprises means for optical transmission of the recorded seismic data to one of the relay buoys or to a vehicle.

12. A system as claimed in claim 6, wherein each seismic signal acquisition station comprises means for optical transmission of the recorded seismic data to one of the relay buoys or to a vehicle.

13. A system as claimed in claim 1, wherein each relay buoy comprises means cooperating with the control unit for acquiring and dating acoustic signals relative to a position of the seismic acquisition stations and for transmitting the acquired and dated acoustic signals to the central control and acquisition station at a same time as coordinates thereof received by the receiver of the satellite positioning system.

14. A system as claimed in claim 2, wherein each relay buoy comprises means cooperating with the control unit for acquiring and dating acoustic signals relative to a position of the seismic acquisition stations and for transmitting the acquired and dated acoustic signals to the central control and acquisition station at a same time as coordinates thereof received by the receiver of the satellite positioning system.

15. A system as claimed in claim 3, wherein each relay buoy comprises means cooperating with the control unit for acquiring and dating acoustic signals relative to a position of the seismic acquisition stations and for transmitting the acquired and dated acoustic signals to the central control and acquisition station at a same time as coordinates thereof received by the receiver of the satellite positioning system.

16. A system as claimed in claim 4, wherein each relay buoy comprises means cooperating with the control unit for acquiring and dating acoustic signals relative to a position of the seismic acquisition stations and for transmitting the acquired and dated acoustic signals to the central control and acquisition station at a same time as coordinates thereof received by the receiver of the satellite positioning system.

17. A system as claimed in claim 5, wherein each relay buoy comprises means cooperating with the control unit for acquiring and dating acoustic signals relative to a position of the seismic acquisition stations and for transmitting the acquired and dated acoustic signals to the central control and acquisition station at a same time as coordinates thereof received by the receiver of the satellite positioning system.

18. A system as claimed in claim 6, wherein each relay buoy comprises means cooperating with the control unit for acquiring and dating acoustic signals relative to a position of the seismic acquisition stations and for transmitting the acquired and dated acoustic signals to the central control and acquisition station at a same time as coordinates thereof received by the receiver of the satellite positioning system.

19. A system as claimed in claim 1, wherein each relay buoy comprises means for recording acquired seismic data coming from the bottom seismic signal acquisition stations and for transmitting the date to the central control and recording station.

20. A system as claimed in claim 2, wherein each relay buoy comprises means for recording acquired seismic data coming from the bottom seismic signal acquisition stations and for transmitting the date to the central control and recording station.

21. A system as claimed in claim 3, wherein each relay buoy comprises means for recording acquired seismic data coming from the bottom seismic signal acquisition stations and for transmitting the date to the central control and recording station.

22. A system as claimed in claim 4, wherein each relay buoy comprises means for recording acquired seismic data coming from the bottom seismic signal acquisition stations and for transmitting the date to the central control and recording station.

23. A system as claimed in claim 5, wherein each relay buoy comprises means for recording acquired seismic data coming from the bottom seismic signal acquisition stations and for transmitting the date to the central control and recording station.

24. A system as claimed in claim 6, wherein each relay buoy comprises means for recording acquired seismic data coming from the bottom seismic signal acquisition stations and for transmitting the date to the central control and recording station.

25. A system as claimed in claim 1, wherein each relay buoy comprises means for managing transmission of a signal for triggering a seismic source to synchronize acquisition of the seismic data by the bottom seismic signal acquisition stations.

26. A system as claimed in claim 2, wherein each relay buoy comprises means for managing transmission of a signal for triggering a seismic source to synchronize acquisition of the seismic data by the bottom seismic signal acquisition stations.

27. A system as claimed in claim 3, wherein each relay buoy comprises means for managing transmission of a signal for triggering a seismic source to synchronize acquisition of the seismic data by the bottom seismic signal acquisition stations.

28. A system as claimed in claim 4, wherein each relay buoy comprises means for managing transmission of a signal for triggering a seismic source to synchronize acquisition of the seismic data by the bottom seismic signal acquisition stations.

29. A system as claimed in claim 5, wherein each relay buoy comprises means for managing transmission of a signal for triggering a seismic source to synchronize acquisition of the seismic data by the bottom seismic signal acquisition stations.

30. A system as claimed in claim 6, wherein each relay buoy comprises means for managing transmission of a signal for triggering a seismic source to synchronize acquisition of the seismic data by the bottom seismic signal acquisition stations.

31. A system as claimed in claim 3, wherein each bottom seismic signal acquisition station comprises means associated with the sealed body for providing buoyancy and means for disconnecting the body from the part or boom at a command of central station.

32. A system as claimed in claim 2, wherein each bottom seismic acquisition station comprises means associated with sealed body for providing buoying and means for disconnecting the body from the boom at a command of central station.

33. A system as claimed in claim 3, wherein each bottom seismic acquisition station comprises means associated with sealed body for providing buoying and means for disconnecting the body from the boom at a command of central station.

34. A system as claimed in claim 4, wherein each bottom seismic acquisition station comprises means associated with sealed body for providing buoying and means for disconnecting the body from the boom at a command of central station.

35. A system as claimed in claim 5, wherein each bottom seismic acquisition station comprises means associated with sealed body for providing buoying and means for disconnecting the body from the boom at a command of central station.

36. A system as claimed in claim 6, wherein each bottom seismic acquisition station comprises means associated with sealed body for providing buoying and means for disconnecting the body from the boom at a command of central station.

37. A system as claimed in claim 1, wherein each bottom seismic signal acquisition station comprises means for coupling to an transmission network, for providing direct transfer of stored seismic data to the central station.

38. A system as claimed in claim 2, wherein each bottom seismic signal acquisition station comprises means for coupling to an transmission network, for providing direct transfer of stored seismic data to the central station.

39. A system as claimed in claim 3, wherein each bottom seismic signal acquisition station comprises means for coupling to an transmission network, for providing direct transfer of stored seismic data to the central station.

40. A system as claimed in claim 4, wherein each bottom seismic signal acquisition station comprises means for coupling to an transmission network, for providing direct transfer of stored seismic data to the central station.

41. A system as claimed in claim 5, wherein each bottom seismic signal acquisition station comprises means for coupling to an transmission network, for providing direct transfer of stored seismic data to the central station.

42. A system as claimed in claim 6, wherein each bottom seismic signal acquisition station comprises means for coupling to an transmission network, for providing direct transfer of stored seismic data to the central station.

43. A system as claimed in claim 1, wherein the central station comprises a control including a central unit associated with a storage means, and an interface for managing exchanges between the central unit and a graphics interface that manages exchanges with a visual display and printing means, a mass storage means, and means for communication with seismic signal acquisition stations and the relay buoys, means for providing communication with the relay buoys by a radio link and reception of positioning signals by satellite, and a means for control and triggering of a seismic source.

44. A system as claimed in claim 2, wherein the central station comprises a control including a central unit associated with a storage means, and an interface for managing exchanges between the central unit and a graphics interface that manages exchanges with a visual display and printing means, a mass storage means, and means for communication with seismic signal acquisition stations and the relay buoys, means for providing communication with the relay buoys by a radio link and reception of positioning signals by satellite, and a means for control and triggering of a seismic source.

45. A system as claimed in claim 3, wherein the central station comprises a control including a central unit associated with a storage means, and an interface for managing exchanges between the central unit and a graphics interface that manages exchanges with a visual display and printing means, a mass storage means, and means for communication with seismic signal acquisition stations and the relay buoys, means for providing communication with the relay buoys by a radio link and reception of positioning signals by satellite, and a means for control and triggering of a seismic source.

46. A system as claimed in claim 4, wherein the central station comprises a control including a central unit associated with a storage means, and an interface for managing exchanges between the central unit and a graphics interface that manages exchanges with a visual display and printing means, a mass storage means, and means for communication with seismic signal acquisition stations and the relay buoys, means for providing communication with the relay buoys by a radio link and reception of positioning signals by satellite, and a means for control and triggering of a seismic source.

47. A system as claimed in claim 5, wherein the central station comprises a control including a central unit associated with a storage means, and an interface for managing exchanges between the central unit and a graphics interface that manages exchanges with a visual display and printing means, a mass storage means, and means for communication with seismic signal acquisition stations and the relay buoys, means for providing communication with the relay buoys by a radio link and reception of positioning signals by satellite, and a means for control and triggering of a seismic source.

48. A system as claimed in claim 6, wherein the central station comprises a control including a central unit associated with a storage means, and an interface for managing exchanges between the central unit and a graphics interface that manages exchanges with a visual display and printing means, a mass storage means, and means for communication with seismic signal acquisition stations and the relay buoys, means for providing communication with the relay buoys by a radio link and reception of positioning signals by satellite, and a means for control and triggering of a seismic source.

49. A system as claimed in claim 1, comprising a portable control and testing station for providing deployment and recovery of the seismic acquisition stations and data stored therein, including means for locating the seismic signal acquisition stations after return to the surface by a radio link, means for downloading data stored in the seismic signal acquisition stations and for recording the data, means for remote recovery of the seismic data stored in the relay buoys, and means for transferring the seismic data to the central control and recording station by means of a communication network.

50. A system as claimed in claim 2, comprising a portable control and testing station for providing deployment and recovery of the both seismic acquisition stations and of data stored therein, including means for locating the seismic acquisition stations after return to the surface by a radio link, means for downloading data stored in the seismic acquisition stations and for recording the data, means for remote recovery of the seismic data stored in the relay buoys, and means for transferring the seismic data to the central control and recording station by means of a communication network.

51. A system as claimed in claim 3, comprising a portable control and testing station for providing deployment and recovery of the both seismic acquisition stations and of data stored therein, including means for locating the seismic acquisition stations after return to the surface by a radio link, means for downloading data stored in the seismic acquisition stations and for recording the data, means for remote recovery of the seismic data stored in the relay buoys, and means for transferring the seismic data to the central control and recording station by means of a communication network.

52. A system as claimed in claim 4, comprising a portable control and testing station for providing deployment and recovery of the both seismic acquisition stations and of data stored therein, including means for locating the seismic acquisition stations after return to the surface by a radio link, means for downloading data stored in the seismic acquisition stations and for recording the data, means for remote recovery of the seismic data stored in the relay buoys, and means for transferring the seismic data to the central control and recording station by means of a communication network.

53. A system as claimed in claim 5, comprising a portable control and testing station for providing deployment and recovery of the both seismic acquisition stations and of data stored therein, including means for locating the seismic acquisition stations after return to the surface by a radio link, means for downloading data stored in the seismic acquisition stations and for recording the data, means for remote recovery of the seismic data stored in the relay buoys, and means for transferring the seismic data to the central control and recording station by means of a communication network.

54. A system as claimed in claim 6, comprising a portable control and testing station for providing deployment and recovery of the both seismic acquisition stations and of data stored therein, including means for locating the seismic acquisition stations after return to the surface by a radio link, means for downloading data stored in the seismic acquisition stations and for recording the data, means for remote recovery of the seismic data stored in the relay buoys, and means for transferring the seismic data to the central control and recording station by means of a communication network.

55. A method of seismic exploration or monitoring of an underwater underground formation by acquiring seismic data relative to the underwater underground formation, comprising:

installing, at a bottom of a water body, bottom seismic signal acquisition units comprising a part or boom provided with a housing for at least one seismic receiver and an acquisition module for seismic data received by each receiver, each acquisition unit falling under an effect of gravity, to the bottom of the water body and penetrating the bottom to couple the seismic receivers with the underground formation;

determining a position of each acquisition unit installed at the bottom;

emitting seismic waves from an underwater seismic source, receiving waves reflected by discontinuities of the underground formation in response to the seismic waves emitted in the formation and collecting the data received by the receivers of each acquisition unit;

recovering, by a central station, seismic data acquired by each seismic signal acquisition unit; and exchanging between relay buoys and the bottom seismic signal acquisition stations, positioning data, control data from a central station or seismic data acquired by the bottom seismic signal acquisition devices, for transmission to the central station by transmission means in each bottom seismic signal acquisition device and each relay buoy comprising an acoustic transponder, an acoustic positioning module and an acoustic communication module using a modem.

56. A method as claimed in claim 55, comprising positioning and initially time synchronizing each bottom seismic signal acquisition station when placed into the water, by reference to a satellite positioning system, and monitoring descent thereof down to the bottom by a combination of time synchronization data and of time measurements obtained by acoustic telemetry between the bottom seismic signal acquisition station and the relay buoys, until stabilization of the station in contact with the bottom.

57. A method as claimed in claim 55, comprising acoustically transmitting recorded seismic traces picked up by the at least one seismic receiver of each bottom seismic signal acquisition station to a corresponding relay buoy by the transmission means.

58. A method as claimed in claim 56, comprising acoustically transmitting recorded seismic traces picked up by the at least one seismic receiver of each bottom seismic signal acquisition station to a corresponding relay buoy by the transmission means.

59. A method as claimed in claim 57, comprising acoustically transmitting from each acquisition station to a corresponding relay buoy, quality data indicative of a working order of each seismic signal acquisition station.

* * * * *